(12) United States Patent
Shekhar et al.

(10) Patent No.: US 9,818,139 B1
(45) Date of Patent: Nov. 14, 2017

(54) CLASSIFYING USER-PROVIDED CODE (71) Applicant: Amazon Technologies, Inc., Reno, NV (US)

(72) Inventors: Shashank Shekhar, Seattle, WA (US); Cameron Dailey Austgen, Seattle, WA (US); Gurinder Raju, Seattle, WA (US); Satish Kumar Eerpini, Sunnyvale, CA (US); Oleg Oleg Pistolet, Seattle, WA (US); Seth Bradon Kinast, Seattle, WA (US); Teresa Shuk Kwan Lau, Bellevue, WA (US); Jay Austin Crosley, Redmond, WA (US)

(73) Assignee: Amazon Technologies, Inc., Reno, NV (US)

( * ) Notice: Subject to any disclaimer, the term of this patent is extended or adjusted under 35 U.S.C. 154(b) by 960 days.

(21) Appl. No.: 14/094,396

(22) Filed: Dec. 2, 2013

(51) Int. Cl.
  *G06Q 30/00* (2012.01)
  *G06F 15/16* (2006.01)
  *G06F 15/173* (2006.01)
  *G06F 15/177* (2006.01)
  *G06Q 30/06* (2012.01)
  (Continued)

(52) U.S. Cl.
  CPC .......... *G06Q 30/0617* (2013.01); *G06F 7/00* (2013.01); *G06F 9/44* (2013.01); *G06F 11/00* (2013.01); *G06F 15/16* (2013.01); *G06F 15/17* (2013.01); *G06F 17/24* (2013.01); *G06F 17/30* (2013.01);
  (Continued)

(58) Field of Classification Search
  CPC ......... G06C 30/00; G06C 10/00–10/10; G06F 15/16; G06F 9/44; G06F 17/30; G06F 7/00; G06F 21/00; G06F 17/24; G06F 15/17; G06F 11/00; G06Q 30/00; G06Q 10/00–10/10
  USPC ............... 709/217–228, 203–206; 726/6, 23; 705/26.42, 35
  See application file for complete search history.

(56) References Cited

U.S. PATENT DOCUMENTS

| | | | |
|---|---|---|---|
| 6,532,488 B1 * | 3/2003 | Ciarlante | H04L 69/329 709/205 |
| 6,816,882 B1 * | 11/2004 | Conner | G06F 21/121 709/203 |

(Continued)

OTHER PUBLICATIONS

Jaamour, R. (2005). Securing web services. Information Systems Security, 14(4), 36-44. Retrieved from http://dialog.proquest.com/professional/docview/229545126?accountid=161862.*

*Primary Examiner* — Olusegun Goyea
(74) *Attorney, Agent, or Firm* — Kilpatrick Townsend & Stockton LLP (57) ABSTRACT

Processes for classifying, and dynamically adjusting, tiers for web services are described. Depending on the classification of the web service, support resources (e.g. servers, storage, bandwidth or other communications resources, etc.) may be configured in different ways, such as, for example, sharing resources among one or more of the web services, or isolating the resources for particular web services from those of other web services. Various electronic storefronts may be provided by a service provider to merchants/customers of the service provider. The service provider may classify each of the electronic storefronts for the merchants to a plurality of tiers. Such classifying may be performed, for example, during an enrollment of the merchant with the service provider, and/or during operation of the electronic storefront.

24 Claims, 7 Drawing Sheets

(51) Int. Cl.
  *G06F 15/17*  (2006.01)
  *G06Q 10/00*  (2012.01)
  *G06F 17/30*  (2006.01)
  *G06F 9/44*  (2006.01)
  *G06F 7/00*  (2006.01)
  *G06Q 10/10*  (2012.01)
  *G06F 17/24*  (2006.01)
  *G06F 21/00*  (2013.01)
  *G06F 11/00*  (2006.01)

(52) U.S. Cl.
  CPC ............ *G06F 21/00* (2013.01); *G06Q 10/00* (2013.01); *G06Q 10/10* (2013.01); *G06Q 30/00* (2013.01)

(56) References Cited

U.S. PATENT DOCUMENTS

| | | | | |
|---|---|---|---|---|
| 7,457,870 | B1* | 11/2008 | Lownsbrough | H04L 41/5058 709/217 |
| 7,698,398 | B1* | 4/2010 | Lai | G06F 8/10 709/223 |
| 7,747,713 | B1* | 6/2010 | Spalink | G06Q 30/02 709/223 |
| 8,065,327 | B2* | 11/2011 | Rosenfield | G06F 17/3089 707/781 |
| 8,515,941 | B1* | 8/2013 | Avritch | G06Q 10/10 707/711 |
| 9,256,353 | B2* | 2/2016 | Wilkinson | G06F 9/468 |
| 9,357,031 | B2* | 5/2016 | Keith, Jr. | H04L 63/10 |
| 2002/0116287 | A1* | 8/2002 | Schubert | G06Q 30/06 705/26.61 |
| 2002/0143862 | A1* | 10/2002 | Peterson | H04L 61/00 709/203 |
| 2005/0171858 | A1* | 8/2005 | Cotton | G06Q 30/06 705/26.42 |
| 2006/0085530 | A1* | 4/2006 | Garrett | G06F 11/3495 709/223 |
| 2006/0178976 | A1* | 8/2006 | Vu | G06Q 30/02 705/35 |
| 2006/0253582 | A1* | 11/2006 | Dixon | G06F 17/30864 709/225 |
| 2006/0253583 | A1* | 11/2006 | Dixon | H04L 63/1441 709/225 |
| 2007/0294134 | A1* | 12/2007 | Yang | G06Q 30/06 705/26.2 |
| 2009/0077670 | A1* | 3/2009 | Schireson | G06F 21/6218 726/27 |
| 2009/0138379 | A1* | 5/2009 | Scheman | G06Q 30/0601 705/26.1 |
| 2010/0186088 | A1* | 7/2010 | Banerjee | G06F 21/51 726/23 |
| 2010/0325266 | A1* | 12/2010 | Nishimura | H04L 67/16 709/224 |
| 2010/0332478 | A1* | 12/2010 | Duman | G06F 17/241 707/738 |
| 2011/0004916 | A1* | 1/2011 | Schiffman | G06F 9/5011 726/1 |
| 2011/0137904 | A1* | 6/2011 | Rajaram | G06F 17/30705 707/740 |
| 2012/0109905 | A1* | 5/2012 | Tingstrom | G06F 17/227 707/690 |
| 2012/0110093 | A1* | 5/2012 | Tingstrom | G06F 17/30899 709/206 |
| 2012/0259826 | A1* | 10/2012 | Zalila-Wenkstern | G06F 17/30873 707/706 |
| 2013/0014236 | A1* | 1/2013 | Bingell | G06F 21/45 726/6 |
| 2013/0174126 | A1* | 7/2013 | Belihomji | G06F 11/3688 717/127 |

* cited by examiner

CLASSIFYING USER-PROVIDED CODE

BACKGROUND

The advantages of e-commerce (e.g. the buying and selling of products or services over electronic systems such as the Internet) have led to exponential increases in the number, and scope, of different sites used to link customers and sellers. Facilitating this expansion, have been various web service providers that design and/or manage companies' websites. In this regard, a service provider may offer to set up and manage different companies' websites, e.g. "virtual storefronts," that allow customers to browse and purchase items. However, when a service provider offers to manage the websites for different companies/entities in a given hosting environment, the provider is typically faced with a decision to isolate the resources for each of the different websites (to maintain security between the websites), or maintain control of all of the code used in the different websites (to inhibit the possibility of malicious code being introduced via one of the entities).

Unfortunately, each of these options have downsides. For example, isolating the resources of all the different websites supported by a service provider is usually inefficient and leads to significantly higher baseline costs for many entities that would benefit from shared resources. On the other hand, maintaining control of all of the code used in the different websites can unduly limit a customer's options in managing their storefront, and may preclude the otherwise desirable option of the customer shopping for different individualized support services, while still using the primary service provider to manage the overall operation and maintenance of the website.

More specifically, in a shared, multi-tenant hosting environment that runs untrusted seller-supplied code, it may be difficult to isolate the impact of a malicious "seller" attacking another seller. At the same time, an overprotective system with inter-seller isolation is often expensive to run, and may be prohibitively expensive for many small business merchants.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, techniques for supporting various levels of web service management (e.g. different support "tiers") for electronic marketplaces or virtual/electronic storefronts, or other web services, provided by a service provider. Various processes for classifying, and dynamically adjusting, tiers for web services are described. Depending on the classification of the web service, support resources (e.g. servers, storage, bandwidth or other communications resources, etc.) may be configured in different ways, such as, for example, sharing resources among one or more of the web services, or isolating the resources for particular web services from those of other web services. In some examples, various electronic storefronts may be provided by a service provider to entities, such as merchants that are customers of the service provider. The service provider may classify each of the electronic storefronts for the entities to a plurality of tiers. Such classifying may be performed, for example, during an enrollment of the entity with the service provider, and/or during operation of the electronic storefront.

According to certain aspects of the present subject matter, the various codes running on different web services in a multi-tenant hosting environment may be classified into different security risk-levels. This risk classification can be done using various sources, such as (a) whether the code is an unmodified service provider provided code,
(b) whether the code author is a trusted party,
(c) using automated code analysis tools, etc.

Using such classifications, and others described herein, the code execution of different tiers may be grouped or isolated by a service provider in an effective and cost-efficient manner. For example, zero-risk (or near zero-risk) entities (e.g. customers, merchants and/or sellers) may be pooled together with little to no risk of inter-seller attacks, while high-risk sellers can be kept away with costlier isolation.

As used herein, web services should be broadly understood as applying to various aspects of e-commerce, publishing, or similar services supported by network and/or web hosting services. In some examples, a given web service may be associated with a particular webstore or virtual storefront for a particular merchant.

In some examples, a web service such as a website, a virtual storefront, a webstore, etc., may be provided as part of an electronic marketplace, and may be managed by one or more service provider computers (e.g., servers) that host electronic content in the form of, for example, an electronic catalog, with or without associated purchase and billing functionality, may be provided for various merchants. Customers may access the web service, e.g. a virtual storefront, to view, review, discuss, order, and/or purchase items (e.g., physical items or services) from the web service.

Embodiments of the present disclosure may include, among other things, processes for providing various web services, such as webstores, for different merchants, as mentioned above, and may further include classifying particular web services for merchants, or other users, according to various criteria, such as the potential for malicious code being present within the web service, traffic associated with the web service, security features associated with the web service, etc.

Depending on the classification of the web service, support resources (e.g. servers, storage, bandwidth or other communications resources, etc.) may be configured in different ways, such as, for example, sharing resources among one or more of the web services, or isolating the resources for particular web services from those of other web services. For example, various virtual storefronts may be provided by a service provider to entities, such as merchants, that are customers of the service provider. As used herein, a customer of the service provider may include merchants and other entities that the service provider is providing web services for, whereas a customer of a merchant or other entity may include someone that is accessing the web service, e.g. to purchase goods or services from the merchant, etc. The service provider may classify each of the virtual storefronts for the merchants to a plurality of tiers. Such classifying may be performed, for example, during an enrollment of the merchant with the service provider, and/or during operation of the virtual storefront.

It should be appreciated that the number of tiers is not limited according to the present subject matter, and may take any number more than one. In some examples, the tiers may include a first tier for virtual storefronts encompassing web services comprising code provided by the service provider; a second tier for virtual storefronts encompassing web services comprising code provided by the service provider and an authorized solution provider (other than the service provider); and/or a third tier for virtual storefronts encompassing web services including other code provided by a source other than the service provider and an authorized solution provider. However, different and/or additional tiers may also be used.

In some examples, code provided by a source other than the service provider and an authorized solution provider may include modified code based at least in part on code provided by the service provider and/or the authorized solution provider. That is, in some examples, algorithms may be provided that detect when previously authenticated code has changed, as well as when discreet sections of code have been added.

In some examples, e.g. those including a classification being performed during an enrollment of the merchant/customer with the service provider, a selection may be received from the merchant regarding the tier that the virtual storefront will be assigned to (at least initially).

In some examples, e.g. those including a classification being performed during operation of the virtual storefront, the classifying may include the service provider (or other entity) performing an automated scan of code included in the virtual storefront, or other web service, that detects, for example, code other than authentic code provided by the service provider and/or other solution provider.

Additionally, in some aspects, code provided by an authorized solution provider may be validated (e.g. by the service provider) based at least in part on one or more of an author identification, a designated pipeline through which the code is received, and/or an encryption technique applied to the code.

In some examples, web services classified in a certain tier may be mutually supported by a first subset of resources (such as a particular subset of servers), whereas web services classified in another tier may be supported collectively, or individually, by another, distinct, subset of resources (e.g. a second subset of servers that are isolated from the first subset of servers). For example, web services in a first tier may be commonly supported and managed by the service provider on common servers and/or database infrastructure; web services in a second tier may be supported by a subset of servers or infrastructure according to some commonality among the second tier web services, and/or web services in a third tier may be isolated from one another, and/or from web services in the other tiers, and/or supported by their own exclusive servers and/or infrastructure.

In some examples, web services in a certain tier may be assigned to shared resources based at least in part on, for example, one or more solution providers that have provided code to the web service. In some examples, algorithms may be configured to classify web services to a certain tier based at least in part on an assessment of multiple code sources and may, for example, classify a web service to a tier according to a least trusted source.

In some examples, the tiers may be classified and/or further subdivided, for example, according to security features included in the code for the web service, a vulnerability found in the code for the web service, an agreement by the merchant/customer to allow periodic scanning of the code for the web service, and/or a refusal by the merchant/customer to allow periodic scanning of the code for the web service. For example, web services including similar code may be classified in different tiers depending on whether the respective merchants allow scanning of their code.

In some examples, the tier classification of a web service may be altered (e.g. by the service provider) based at least in part on, for example, a detected change in the code of, or addition of code to, the code for the web service, traffic patterns for the web service, or other parameters. In some examples, the service provider may alert the merchant if a scan, or other alert, indicates that the tier classification of a web service needs to be changed, e.g. to allow the merchant to correct the problem.

Additionally, in some aspects, a computer system may be configured to execute one or more processes, such as those discussed above and further herein. For example, a computer system may be configured to provide a web service supported by a service provider for a plurality of entities, and classify each of the web services for the entities to a plurality of tiers. In some examples, certain web services may be classified in a first tier, all of which are mutually supported by a first subset of servers or other support infrastructure. Web services classified in another tier may be supported individually by assigned servers, and isolated from the other servers supporting other web services. In some examples, the computer system may be configured to classify web services to one or more other tiers, that may use various forms of collective/shared support structures according to, for example, those web services including code provided by an authorized solution provider other than the service provider.

Additionally, in some aspects, a computer-readable storage medium may be provided including computer-executable instructions that, when executed by one or more computer systems, configure the one or more computer systems to perform operations described herein.

The techniques described above and below may be implemented in a number of ways and in a number of contexts. Several example implementations and contexts are provided with reference to the following figures, as described below in more detail. However, the following implementations and contexts are but a few of many.

Figure 1:
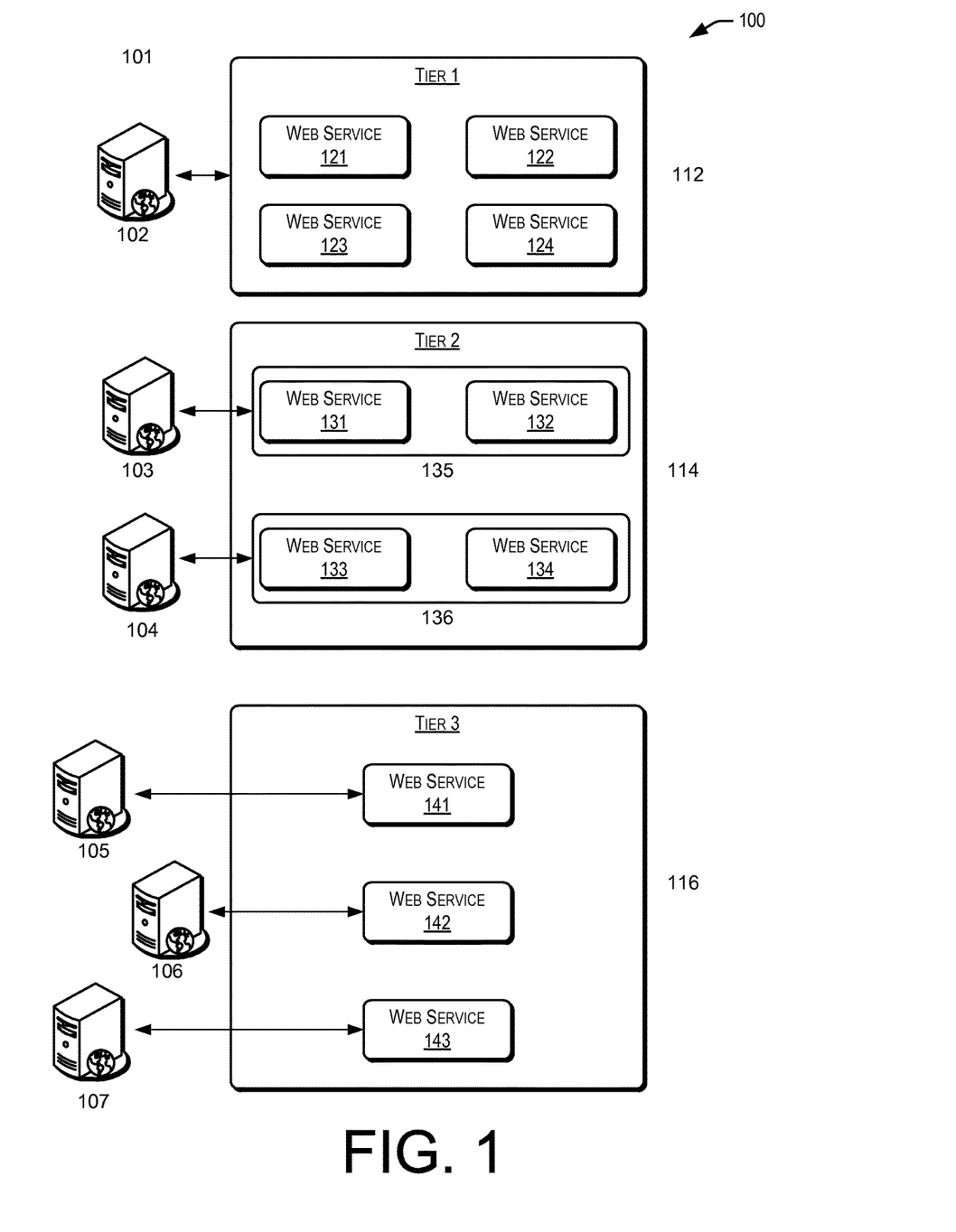
FIG. 1 illustrates an environment including a tiered support structure, according to at least one example.

FIG. 1 illustrates an environment including a tiered support structure, according to at least one example. As shown in FIG. 1, multi-tenant hosting environment 100 includes service provider resources 101, including server/resources 102-107. It should be appreciated that server/resources 102-107 may include, for example, computer server(s), storage, databases and/or other support infrastructure such as described herein.

A first tier of web services 121-124 is shown in block 112. Web services 121-124, and the other web services depicted in FIG. 1, may take various forms and may include, for example, virtual storefronts for different merchants, publication websites, blogs, combinations thereof, and/or other services known in the art.

Web services 121-124 may be assigned to the first tier according to, for example, the code for each of web services being provided by the service provider, as discussed further herein, and may be configured by the service provider to share common resource(s) 102. Thus, the web services shown in block 112 may be understood to pose the lowest threat of introducing malicious code to other of the web services 121-124, or to shared resources 102.

A second tier of web services 131-134 is shown in block 114. Web services 131-134, may take various forms as mentioned above. Web services 131-124 may be assigned to the second tier according to, for example, including code from solutions provider(s) other than the service provider, as discussed further herein, and may be configured by the service provider to share common resource(s) 103 and 104 according to groupings 135, 136. For example, web services 131 and 132 may include code from a certain solution provider, or solution providers that are assessed to share a common security and/or threat level, and may therefore be supported by resources 103. Web services 133 and 134 may include code from another solution provider, or solution providers that are assessed to share a common security and/or threat level (different than web services 131 and 135), and may therefore be supported by resources 104.

Thus, the web services shown in block 114 may be understood to pose an intermediate threat, and may be grouped together with respect to supporting resources 103 and 104, and isolated from the other group in block 114, as well as the resources 102.

A third tier of web services 141-143 is shown in block 116. Web services 141-143, may take various forms as mentioned above. Web services 141-143 may be assigned to the third tier according to, for example, including code from a source other than the service provider or recognized solutions provider(s), as discussed further herein, and may be configured by the service provider to rely on exclusive resources 105-107, respectively. That is, web service 141 may be supported (e.g. in a stand-alone manner) by resources 105, web service 142 may be supported by resources 106, and web service 143 may be supported by resources 107.

Thus, the web services shown in block 116 may be understood to pose a high threat, and may be isolated from each other, as well as from the resources 102-104.

A structure such as shown in FIG. 1 may be implemented, for example, by a single service provider providing multiple webstores, or other sites, to merchants or other entities. In embodiments, the webstores or other web services may be tiered as shown in FIG. 1 according to various criteria, including the likelihood of malicious code being present in the web store or other web service, as described above, and other criteria discussed further herein.

Figure 2:
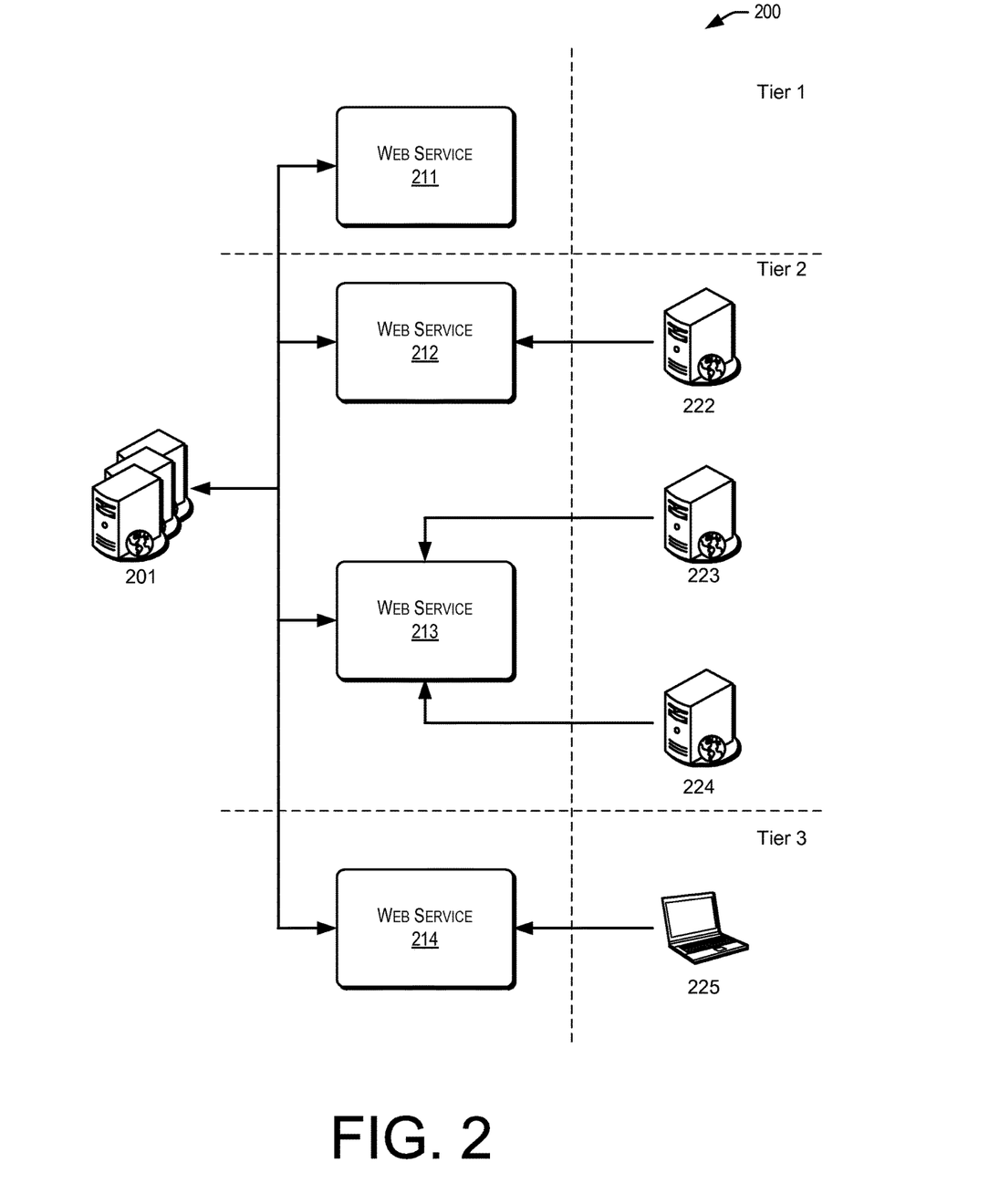
FIG. 2 illustrates another example of a multi-tenant hosting environment in which code may be provided from various sources, according to at least one other example.

FIG. 2 illustrates another example of a multi-tenant hosting environment in which code may be provided from various sources, according to at least one other example. As shown in FIG. 2, multi-tenant hosting environment 200 includes service provider resources 201, e.g. computer server(s), storage, databases and/or other support infrastructure such as described herein.

Service provider resources 201 may support web services 211-214 in a tiered manner similar to that described with respect to FIG. 1, i.e. various of web services 211-214 may be supported by commonly accessed or segregated servers or other resources.

In the example shown in FIG. 2, web service 211 is shown as receiving code exclusively from service provider resources 201 and may, therefore, be classified in the most trusted tier among web services 211-214.

Web services 212 and 213 are shown as receiving code from one or more of recognized solution providers 222-224, as well as service provider resources 201, and may, therefore, be classified in an intermediate tier among web services 211-214. In some examples, the service provider 201 may be able to determine the authenticity of the code provided by solution providers 222-224 according to one or more of an author identification, a designated pipeline through which the code is received from solution providers 222-224, and/or an encryption technique applied to the code. For example, when code is provided by a recognized solution provider, it may include a known author ID. Any subsequent change to the code may overwrite the author ID with another identification that the service provider 201 could recognize as inauthentic.

As another example, the service provider may monitor incoming code to web services 212 and 213 and may confirm that such code was received according to a designated pipeline, channel and/or address associated with the particular solution provider 222-224. For example, the service provider can verify that the code has been received from a known (IP/network) address, or VPN, that has been previously verified to be owned by one of solution providers 222-224. This may be different from the preceding example in which code may be delivered from an arbitrary location, but includes a token or secret that proves the identity of 222-224.

As another example, the service provider 201 and one or more of solution providers 222-224 may utilize encryption and decryption, such as public/private key encryption, to ensure the source of code provided by solution providers 222-224. Accordingly, code provider identity confirmation may be based at least in part on various methods, including techniques based at least in part on encryption, tokens, a particular verified sender being associated with a known pipeline, channel and/or address, etc.

Web service 213 is shown as receiving code from both of solution providers 223 and 224. In some examples, the service provider 201 (or other entity) may classify the tier for web service 213 according to a least trusted of solution providers 223 and 224. For example, if solution provider 223 is judged to be less secure (e.g. due to the lack of security features or the inclusion of potentially dangerous code), then web service 213 may be classified in a tier, and share resources with other web services, based at least in part on solution provider 223, not solution provider 224.

In the example shown in FIG. 2, web service 214 is shown as receiving code from one or more other sources 225, as well as from service provider resources 201. Other source 225 may be virtually any source and may include for example individual merchants that want to manage their own code, unauthorized changes to code included in web service 214 (e.g. a hack), or additional widgets or other applications that are not recognized and/or trusted by service provider 201.

In any event, web service 214 may be classified in a relatively high-threat tier among web services 211-214, and may be segregated from the resources used by other web services 211-213.

It should be further understood that the foregoing classifications may be dynamically assessed and/or changed. For example, certain applications may be added to service provider 201's "trusted" list, or the like, which may change a previously unrecognized source 225 to a recognized solution provider source.

Figure 3:
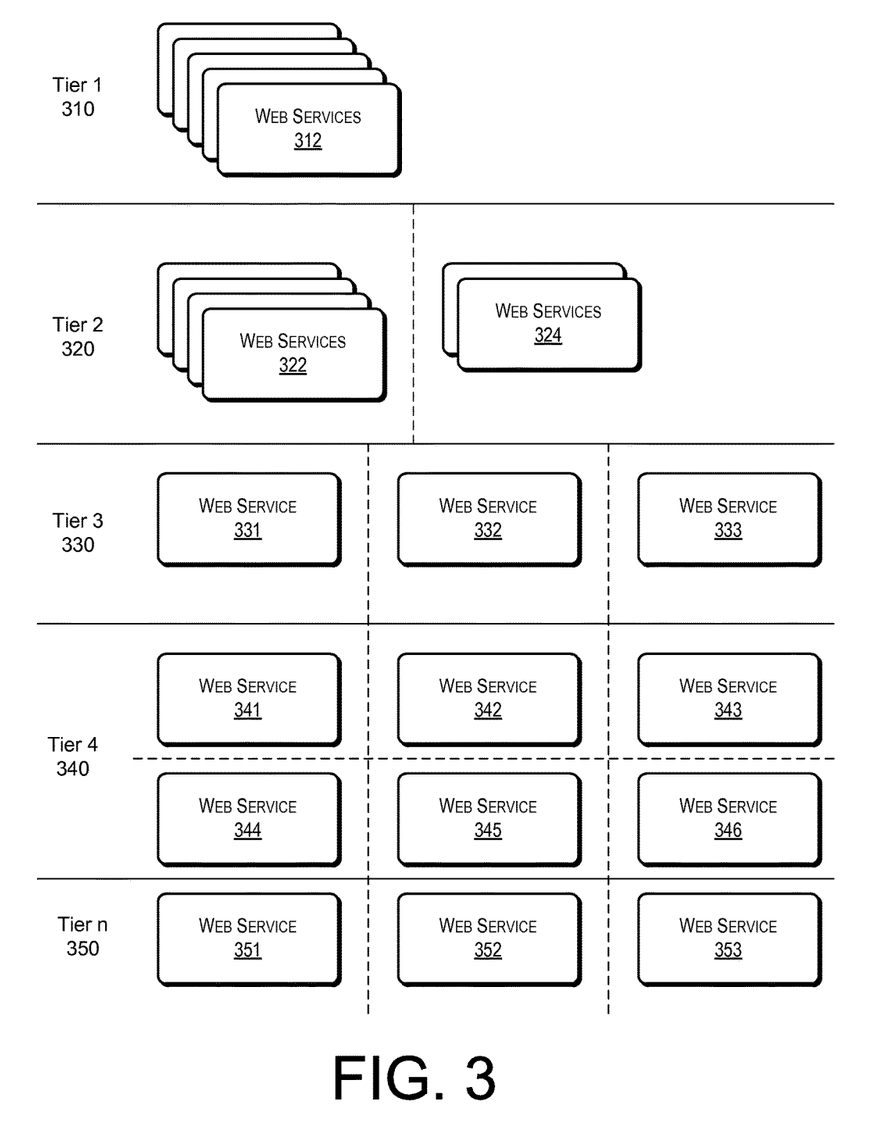
FIG. 3 illustrates another example of a multi-tenant hosting environment supporting various web services using a tiered approach, according to at least one other example.

FIG. 3 illustrates yet another example of a multi-tenant hosting environment supporting various web services using a tiered approach. As shown in FIG. 3, a plurality of web services 312 may be classified in Tier 1 (310), and may, for example, share a common resource pool such as depicted with reference to block 112 in FIG. 1.

Another plurality of web services 322 may be classified in Tier 2 (320), and may share a resource pool according to, for example, including code from a particular solution provider, such as depicted with reference to block 135 in FIG. 1. Another plurality of web services 324 may also be classified in Tier 2 (320), and may share a different resource pool than web services 322.

Another plurality of web services 331-333 may be classified in Tier 3 (330), and may each be assigned at least one dedicated resource according to, for example, including code from an unknown source. The at least one dedicated resource may be, for example, a dedicated server, database or the like. In some examples, the web services 331-333 may share at least one other resource, e.g. communications bandwidth or other support resource that does not pose a significant threat or that presents a threat that can be adequately mitigated. Other support resources might include, but are not limited to, shared support infrastructure such as health checking of the system, access/activity logs, and supporting software required for the system to run. For example, it does not pose a significant threat if 331-333 are all able to report their health to the same endpoint, because a malicious health report from 331 would have no effect on the health or the reporting of 332 and 333. In the same way, a software library that can be used by software running on services 331-333 does not need a separate copy installed for each service, since they have no ability to maliciously alter the library or otherwise effect changes to the library.

Another plurality of web services 341-346 may be classified in Tier 4 (340), and may each be assigned at least one dedicated resource according to, for example, including code from an unknown source. In some examples, web services 341-346 may be assigned to Tier 4 (340) according to, for example, an absence of security features included in the code for the web service, a vulnerability found in the code for the web service, an agreement by the merchant/customer to allow periodic scanning of the code for the web service, and/or a refusal by the merchant/customer to allow periodic scanning of the code for the web service. In the example shown in FIG. 3, the web services 341-346 may be subjected to different scanning protocols than web services 331-333.

Any number of tiers are possible, and can include additional Tiers n 350, having any number of web services 351-353. In some examples, any of the web services 341-346 and/or 351-353 may be configured as "stand-alone" services with fully dedicated resources that are not shared with any other of the web services. Other variations in the configuration and/or management of different tiered web services are also envisioned and may be applied in additional tiers to those shown in FIG. 3.

In some examples, systems may be configured to classify a web service to different tiers, such as Tier 3, Tier 4, or Tier n as shown in FIG. 3, based at least in part on, for example, other criteria that suggest the potential for malicious code being present within the web service, traffic associated with the web service, security features associated with the web service, etc. Such criteria may be employed in creating multiple classifications (e.g. other tiers or sub-tiers) throughout the threat continuum. For example, any of the web services shown in FIG. 3 may be further assessed to determine whether a classification should be adjusted according to additional threat and/or security indicators.

In some examples, a system may automatically classify a web service to a tier, e.g. Tier 3 (330), if automated scanning tools detect no threat in the web service code (even though it came from an untrusted source), whereas code that fails the automated scanning may be classified as another (higher threat) tier, e.g. Tier 4 (340).

Various algorithms may be implemented to carry out aspects of the disclosure including, for example, algorithms that determine whether web services include any code not provided by the service provider, and/or if any code provided by the service provider has been changed. In embodiments, if the algorithm determines that a web service includes only unaltered code provided by the service provider, then that web service may share at least some common resources, e.g. servers, databases, etc., with other web services. In embodiments, such web services may be run together on the same servers, as shown with reference to block 112 of FIG. 1.

In some embodiments, if the algorithm detects code from an authenticated solution provider, then that web service may be isolated with other web services using the same code and/or solution provider. In some embodiments, the algorithm may be further configured to determine whether the code from the authenticated solution provider was provided via a pre-defined pipeline. In some embodiments, certain servers may be designated to support those web services using code from an authenticated solution provider, or certain servers may be designated to support web services using code from various authenticated solution provider classified at a given level. For example, each authenticated solution provider may be isolated to particular servers, or solution providers may be classified at different sub-tiers, with specific servers managing web services including code provided by different solution providers of the same sub-tier.

In some embodiments, an algorithm may be configured to assess whether code provided by the merchant and/or other solution provider passes an automatic security and code check. For example, additional code (beyond that provided by the support provider) may be scanned for known threats and/or known security features that render the code more or less secure to malicious threats.

In some embodiments, proposed additional code containing known threats may be rejected (e.g. modification of the web service may be disallowed by the service provider), or web services including code with known threats relegated to a lower support tier (e.g. the web services may be automatically isolated to their own servers and other resources).

Returning to FIG. 3, in some examples the addition of certain code to a web service may cause the web service to be reclassified to a different tier, e.g. from Tier 3 (330) to Tier 4 (340). There may be an additional cost to the merchant for doing so, e.g. to support the cost of the service provider dedicating a stand-alone solution to run the web service. Therefore, in some examples an alert may be sent to the customer advising them of a rate increase in such circumstances.

Figure 4:
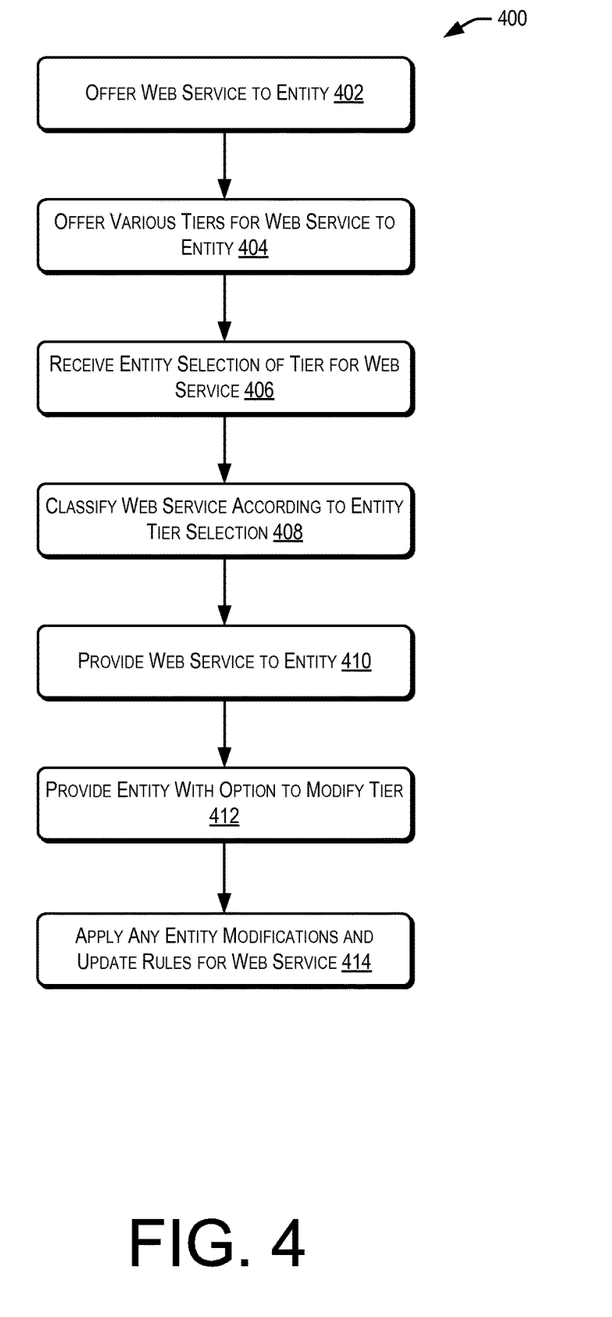
FIG. 4 is a flow diagram depicting an example flow including classifying a web service to a particular tier as described herein, according to at least one example.
Figure 5:
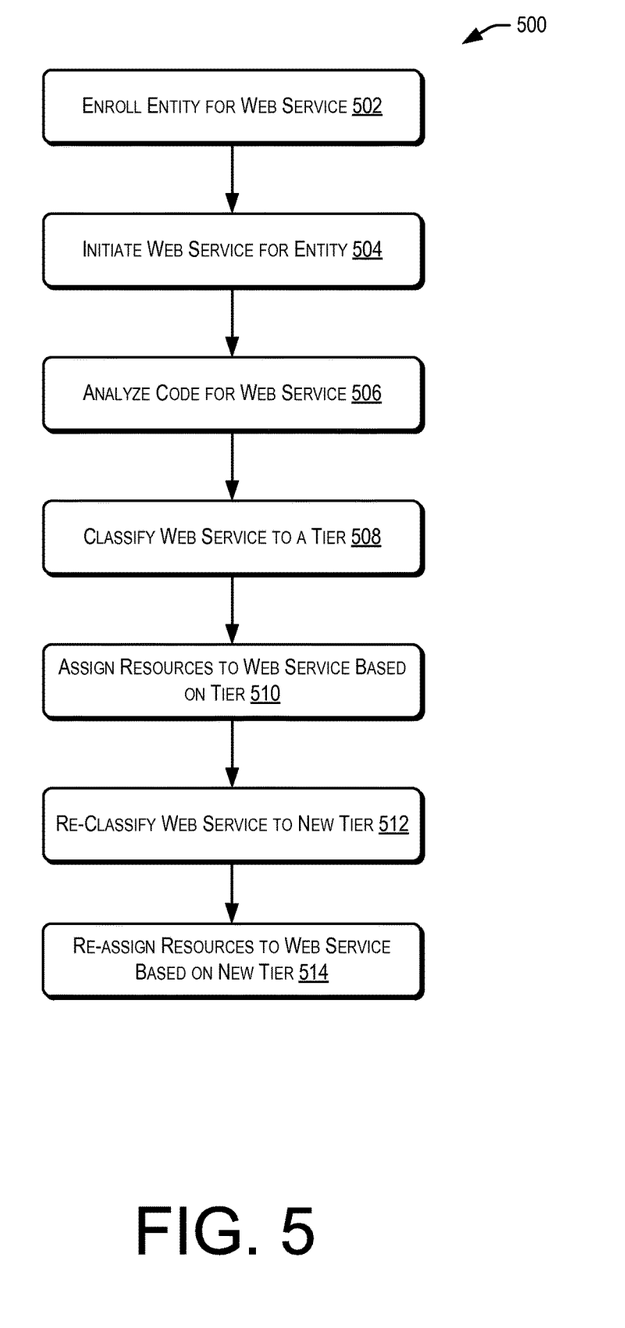
FIG. 5 is a flow diagram depicting an example flow including a customer enrollment for implementing web service support as described herein, according to at least one other example.
Figure 6:
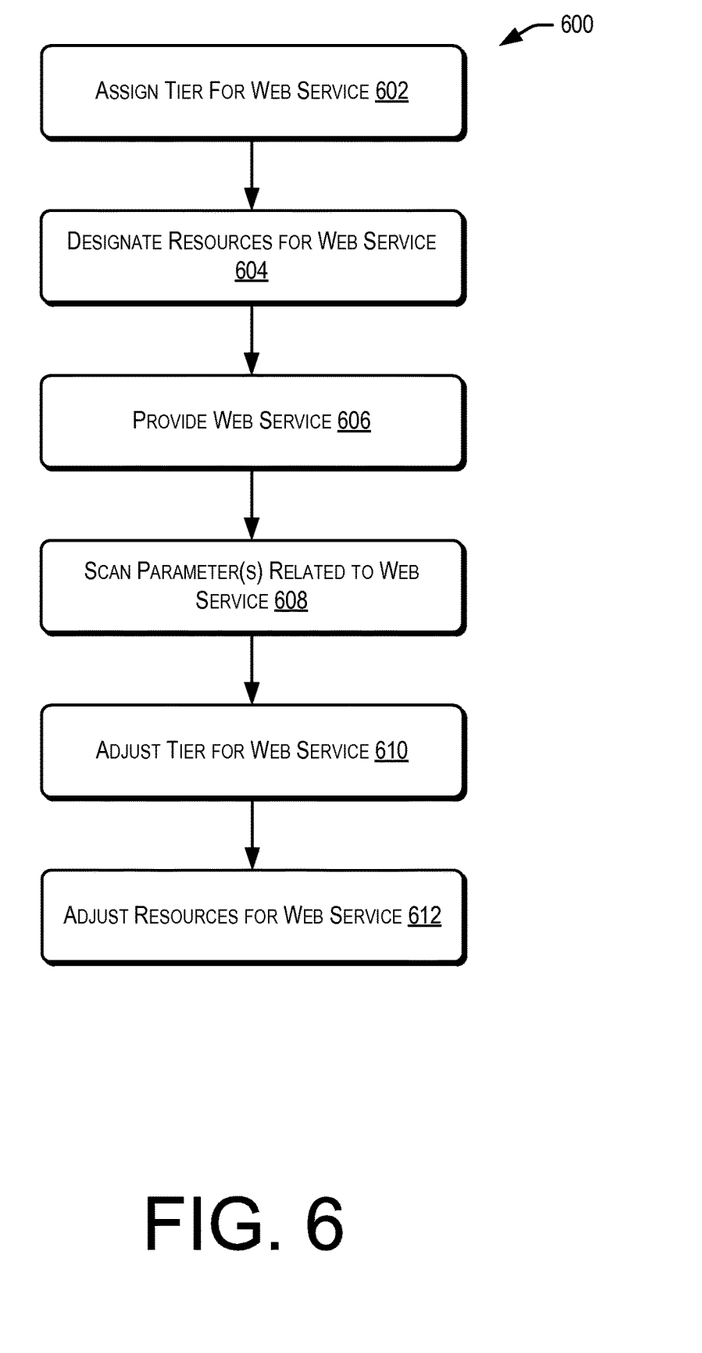
FIG. 6 is a flow diagram depicting an example flow including a dynamic reassignment of support resources for implementing web service support as described herein, according to at least one other example.

FIGS. 4-6 illustrate example flow diagrams showing respective processes 400, 500, and 600 for implementing tier classification processes as described herein. These processes are illustrated as logical flow diagrams, each operation of which may represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the processes. Additionally, any specific reference to one or more operations being capable of being performed in a different order is not to be understood as suggesting that other operations may not be performed in another order.

Some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium may be non-transitory.

FIG. 4 depicts an illustrative flow 400 in which techniques for classifying web services among a plurality of tiers may be implemented. In illustrative flow 400, operations may be performed by one or more processors of one or more service provider computers and/or instructions for performing the operations may be stored in one or more memories of the service provider computers. The flow 400 may begin at 402, in which an offer to provide a web service (e.g. a virtual storefront) to a customer is made by a service provider. Such offers may be made, for example, via an automated web page that the merchant interacts with to purchase web services. In some examples, the service provider may provide the option for the customer to purchase, license, or otherwise acquire, all of the code necessary to establish a website, webstore, etc., from the service provider. In this regard, the service provider may act as a reseller of one or more aspects of the web service being purchased.

In some examples, the service provider may use code acquired from other sources for the web service. However, if the service provider is providing such code to the web service, then it may still be considered to be "service provider provided" code.

The flow 400 may continue with 404, in which the service provider may offer the customer various tiers of web service management and support. In some examples, the tiers offered to the customer may be based at least in part on the potential threat that the customer's requested service presents to other web services managed by the service provider. For example, a first tier may encompass web services comprising code provided by the service provider; a second tier may encompass web services comprising code provided by the service provider and an authorized solution provider (other than the service provider); and/or a third tier may encompass web services including other code provided by a source other than the service provider or an authorized solution provider.

In some examples, the first tier may be commonly supported and managed by the service provider on common servers and/or database infrastructure; the web services of the second tier may be supported by a subset of servers or infrastructure according to some commonality among one or more of the second tier web services, and/or the web services of the third tier may be isolated from one another, and/or from web services in the other tiers, and supported by their own exclusive servers and/or infrastructure.

Additional tiers may be presented to the customer based at least in part on, for example, the customer agreeing to use one or more security features such as virus detection, firewalls, etc., the customer agreeing to code scans of the web service code, or other criteria.

The flow 400 may continue with 406, in which the service provider receives the customer's selection of a tier for the web service. This may be received, for example, via a web page, or other means known in the art.

The flow 400 may continue with 408, in which the service provider may classify the web service according to the customer's selection. In some examples, this may also include verification of one or more code sets provided by the user or other solution provider, e.g. to ensure that the code is consistent with the user's selection. In the event that such code is inconsistent with the customer's selected tier, the customer may be so advised and given the option to change the requested tier and/or change the provided code.

The flow 400 may continue with 410, in which the web service is provided for the customer. In some examples, this may include providing a webstore, or other website, according to preferences selected by the customer, code provided by the customer, and/or code provided by a solution provider, and will normally include at least some code provided by the service provider.

Providing the web service may further include configuring resources of the service provider to support the web service according to the selected tier. For example, a customer selecting a Tier 3 or Tier 4 web service as shown in FIG. 3 may require a stand-alone solution including one or more dedicated servers to provide the web service, whereas a customer selecting a Tier 2 web service as shown in FIG. 3 may need to have their service associated with resources supporting other services using code from the same solution provider.

Providing the web service may further include various levels of support from the service provider and may include the service provider assuming one or more roles/tasks that would otherwise be handled by the customer/merchant. For example, one or more of payment, shipping, restocking, order assembly and/or aggregation, service quotes, and various other services may be provided by the service provider on behalf of the merchant/customer, with or without individual consumers of the web service being aware of the service provider's role. Such support may include, for example, all manner of e-commerce support known in the art and are not described exhaustively herein.

The flow 400 may continue with 412, in which the service provider may provide the customer the option of modifying the selected tier for the web service. This may happen at any time after the customer's initial selection, and may even take place prior to providing the web service. For example, if the analysis conducted in 408 indicates a more appropriate tier than that selected by the customer, e.g. based at least in part on pricing, desired software applications, etc., the service provider may present the customer with the option to change their selection to the more appropriate tier.

In some examples, the service provider may "push" the customer to change the tier of an existing web service, e.g. by offering security features or other solutions that will result in an upgrade to the tier of the web service. In some examples, the option may be presented to the customer based at least in part on a request from the customer to change the tier of the web service, or in response to a suggested change to some code or other aspect of the web service that would otherwise alter the tier of the web service.

The flow 400 may continue with 414, in which any customer modifications are implemented, along with corresponding changes to the web service tier and/or rules. For example, if the user agrees to a suggested security modification, or removal of untrusted content, then the remaining/updated code for the web service may be transferred to appropriate servers and/or servers previously dedicated to the web service may be allowed to share resources among other entities and/or other web services.

Additional examples are described with reference to flow 500 shown in FIG. 5. In illustrative flow 500, operations may be performed by one or more processors of one or more service provider computers and/or instructions for performing the operations may be stored in one or more memories of the service provider computers. The flow 500 may begin at 502, in which a customer is enrolled for a web service, e.g. via an automated process included in a website. The enrollment process may include, for example, the customer providing all of the necessary information for a service provider to establish a web site, webstore, or other service, for the customer. Such information may include user preferences for how a website will appear, selection of functionality offered by the service provider, and/or user-provided or solution provider-provided code to be included in the web service.

The flow 500 may continue with 504, in which the service provider initiates the web service for the customer. This may include, for example, assembling the necessary and/or provided code for the web service, and may include creating a functional version of the web service. In some examples, 504 may be performed on a stand-alone platform (e.g. with resources that are not shared with other web services that the service provider has up and running), for purposes that will be discussed below.

The flow 500 may continue with 506, in which code for the web service is analyzed. In some examples, this may involve confirming that all of the code used by the web service is provided by the service provider, or, if some of the code is provided by another solution provider, then authenticating the code to confirm that it is unaltered. Code provided by an authorized solution provider may be validated (e.g. by the service provider) based at least in part on one or more of an author identification, a designated pipeline through which the code is received, and/or an encryption technique applied to the code. Accordingly, in some examples, an authorized solution provider may be understood as a solution provider that the service provider has a means by which to validate their code.

In some examples, the code may be analyzed to determine whether there is any code other than authentic code provided by the service provider and/or another solution provider.

In some examples, the code may be analyzed to determine whether it includes predetermined security features and/or vulnerabilities.

The flow 500 may continue with 508, in which the web service may be classified, e.g. to a tier, based at least in part on the analysis of the code in 506. The classification may be based, for example, on whether the all of the code used by the web service is provided by the service provider, whether some of the code is provided by an authorized solution provider, whether code provided by an authorized solution provider is authentic, whether there is any code other than authentic code provided by the service provider and/or authorized solution provider, and/or whether it includes predetermined security features and/or vulnerabilities, etc.

The flow 500 may continue with 510, in which resources are assigned to the web service based at least in part on the classification. As mentioned previously, the initial set up and analysis of the code for the web service may be implemented in a stand-alone platform in some examples, thereby protecting other resources from potentially malicious code that may be present in the assembled code. Once the analysis of the code is complete, and the web service classified, the code for the web service may be moved to a shared server, if appropriate, or maintained on the stand-alone platform, if the web service is classified in a potentially malicious tier. Additional resources may also be allocated to, or shared with, the web service, e.g. to support the increased processing, communication and/or storage requirements of a live webstore.

The flow 500 may continue with 512, in which the web service may be periodically evaluated for changes that might require reclassifying the tier for the web service. For example, the customer may add code, a solution provider's software may be out of date, or the service provider may detect any number of other indicators that the web service is malfunctioning or corrupted, e.g. due to checksum errors, unusual volume or processing times, etc.

In some examples, 512 may include assigning the web service to a higher-threat tier, e.g. in which resources must be further limited or the web service isolated from one or more other services. Such reclassification may present in situations such as those mentioned above, e.g. checksum errors, unusual volume or processing times.

In some examples, 512 may include assigning the web service to a lower-threat tier, e.g. in which the web service may be given access to additional shared resources. Such reclassification may present in situations such as when the customer adds security features or removes potentially malicious code from the web service.

The flow 500 may continue with 514, in which any necessary reassignment of resources related to the web service tier change may be implemented. For example, if the web service is changed to a high-threat tier, then the code for the web service may need to be isolated from other servers and/or resources, or if web service is changed to a low-threat tier, then various resources may be reconfigured to provide shared access to the web service.

FIG. 6 depicts an illustrative flow 600 in which techniques for dynamically reclassifying web services among a plurality of tiers may be implemented. In illustrative flow 600, operations may be performed by one or more processors of one or more service provider computers and/or instructions for performing the operations may be stored in one or more memories of the service provider computers. The flow 600 may begin at 602, in which a web service is assigned to a tier. Such assignments may be made, for example, according to any of the methods described herein.

The flow 600 may continue with 604, in which the service provider designates resources for the web service. Such designations may be based at least in part on the tier assigned in 602 and may include shared and/or unshared resources such as servers, databases, communications resources and the like, according to the rules associated with the assigned tier.

The flow 600 may continue with 606, in which the web service is provided by the service provider, e.g. as described further herein.

The flow 600 may continue with 608, in which parameters related to the web service, such as traffic levels, processing times, and the like, may be scanned, e.g. to determine whether there is a potential threat, an attack, or other indicators that would suggest, for example, increasing the assigned tier for the web service to a higher threat level. Other factors might include, for example: (1) origin of the traffic (this could include both physical location as well as method of traffic generation; e.g. is this traffic from a known proxy network?), (2) matching of the payloads against known bad behaviors (e.g. "connect to evilhost.com") that have been previously identified, (3) errors reported by the web service (a higher proportion of errors might be indicative of an attacker), (4) manual or automated blacklisting of certain traffic origins (e.g., requests from a robot fleet that are causing a degradation in service), etc.

The flow 600 may continue with 610, in which the tier assigned to the web service may be adjusted. In some examples, this may involve increasing the tier to a higher threat tier or decreasing the tier to a lower threat tier. For example, if a website goes dormant for a prolonged period of time, it may be considered a low threat, at least until an uptick in traffic is detected. On the other hand, a sudden surge in traffic may suggest raising the tier to a high threat level.

The flow 600 may continue with 612, in which any necessary reassignment of resources related to the web service tier change may be implemented. For example, if the web service is changed to a high-threat tier, then the code for the web service may need to be isolated from other servers and/or resources, or if web service is changed to a low-threat tier, then various resources may be reconfigured to provide shared access to the web service.

It is noted that various of the above methods, particularly those involving the routine scanning of code included in the web services can be accomplished in substantially real time, i.e. in a matter of seconds for hundreds or thousands of web pages or more. Such scans may be performed at scheduled or random time, and/or in response to certain triggers such as a user adding code to a web service. In some examples, a quick check, e.g. a checksum calculation, may be performed on a routine basis, and a more thorough scan for particular threats may be performed based at least in part on a failed checksum or other quick scan.

Figure 7:
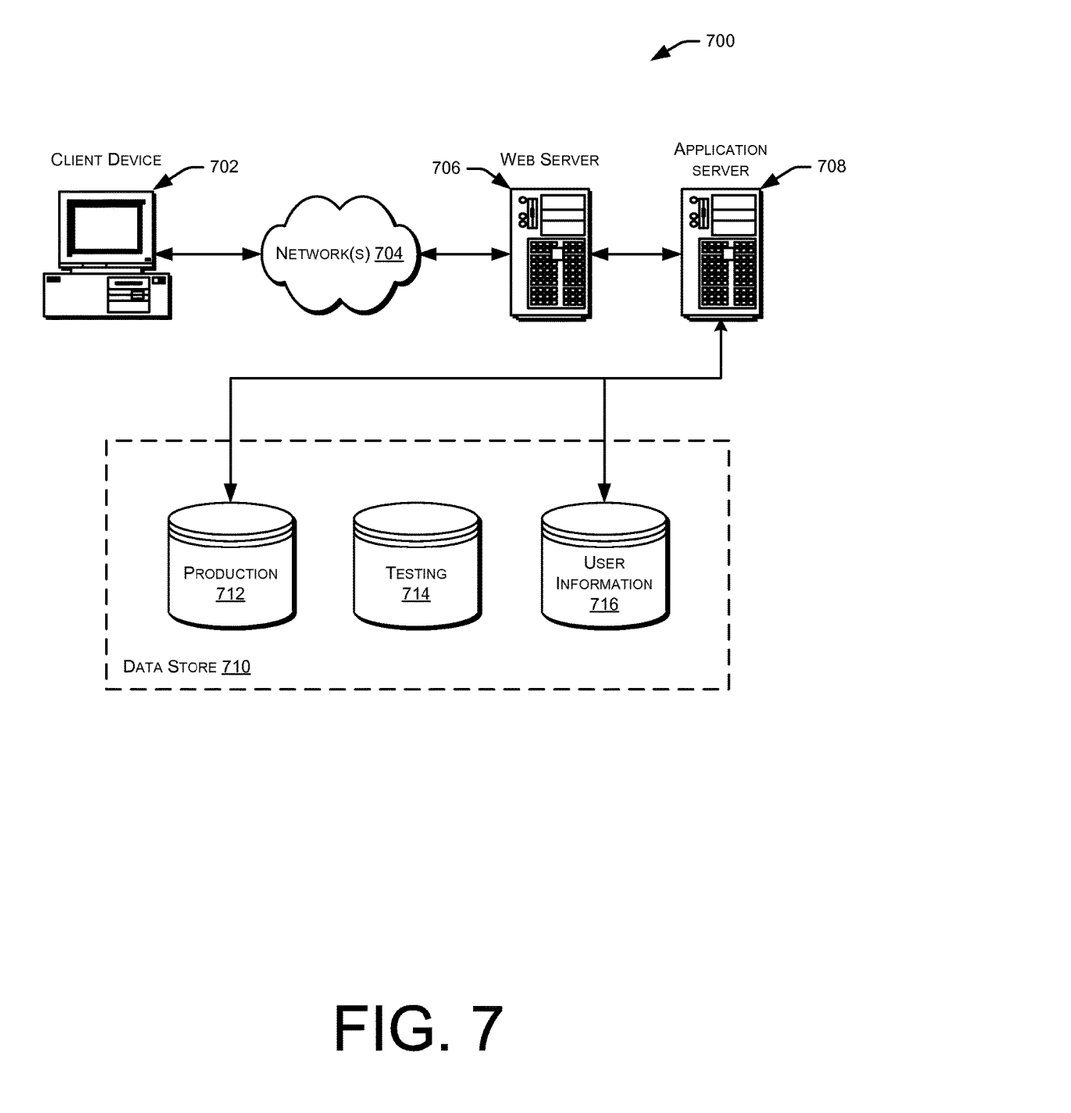
FIG. 7 illustrates an example architecture for implementing web service support as described herein, according to at least one other example.

FIG. 7 illustrates aspects of an example environment 700 for implementing aspects in accordance with various embodiments. As will be appreciated, although a Web-based environment is used for purposes of explanation, different environments may be used, as appropriate, to implement various embodiments. The environment includes an electronic client device 702, which can include any appropriate device operable to send and receive requests, messages, or information over an appropriate network 704 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 706 for receiving requests and serving content in response thereto, although for other networks an alternative device serving a similar purpose could be used as would be apparent to one of ordinary skill in the art.

The illustrative environment includes at least one application server 708 and a data store 710. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714, which can be used for reporting, analysis, or other purposes such as those described herein. It should be understood that there can be many other aspects that may need to be stored in the data store, such as for page image information and to access right information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto.

In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature, and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, DVD or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
providing, by a computer system of a service provider, an electronic storefront to a merchant;
analyzing implementation code included in the electronic storefront to detect one or more characteristics of the implementation code;
classifying the electronic storefront for the merchant to at least one of a plurality of tiers based at least in part on the one or more characteristics of the implementation code, wherein the classifying is performed at least during an enrollment of the merchant with the service provider or during operation of the electronic storefront, and wherein the plurality of tiers includes at least:
a first tier for the electronic storefront encompassing first services including first code provided by the service provider;
a second tier for the electronic storefront encompassing second services including second code provided by the service provider and an authorized solution provider other than the service provider; and
a third tier for the electronic storefront encompassing third services including third code provided by a source other than the service provider and the authorized solution provider;
providing, by the computer system, at least a subset of web resources associated with the service provider to the based at least in part on the classification of the electronic storefront associated with the merchant; and
updating the at least a subset of web resources provided to the merchant by changing a particular web resource of the at least a subset of web resources based at least in part on change in the classification of the electronic storefront-associated with the merchant.

2. The computer-implemented method of claim 1, wherein the third code provided by the source other than the service provider and the authorized solution provider includes modified code based at least in part on the second code provided by the service provider and the authorized solution provider.

3. The computer-implemented method of claim 1, wherein the classifying is performed at least during an enrollment of the merchant with the service provider, and includes receiving a selection from the merchant regarding a particular tier of the plurality of tiers that the electronic storefront will be assigned to.

4. The computer-implemented method of claim 1, wherein the analyzing of the implementation code includes the service provider performing an automated scan of the implementation code to detect whether the implementation code is different from authentic code provided by the service provider.

5. The computer-implemented method of claim 1, wherein the analyzing of the implementation code includes the service provider performing an automated scan to detect malicious code.

6. A system, comprising:
a memory that stores computer-executable instructions; and
a processor configured to access the memory and execute the computer-executable instructions to collectively at least:
provide web services associated with a service provider on behalf of a plurality of entities;

analyze code included in the web services to detect one or more characteristics of the code;

classify at least one of the web services to at least one of a plurality of tiers based at least in part on the one or more characteristics of the code, wherein the plurality of tiers includes at least two of:

a first tier encompassing at least a subset of the web services including first code provided by the service provider;

a second tier encompassing at least a second subset of the web services including second code provided by the service provider and an authorized solution provider other than the service provider; and a third tier encompassing at least a third subset of the web services including third code provided by a source other than the service provider and the authorized solution provider; and provide at least a subset of web resources to a particular entity based at least in part on the classification of the web services.

7. The system of claim 6, wherein at least one of the web services is an electronic storefront service of an electronic marketplace.

8. The system of claim 6, wherein the classifying is performed at least during an enrollment of the entity with the service provider or during operation of at least one of the web services.

9. The system of claim 6, wherein the classification of the web services is updated at least during operation of at least one of the web services.

10. The system of claim 6, wherein:
the code is implementation code included in at least one of the web services; and
analyzing the code includes the service provider performing an automated scan of the implementation code, the automated scan configured to identify if the implementation code is different from authentic code provided by the service provider.

11. The system of claim 6, wherein:
the code is implementation code included in at least one of the web services; and
analyzing the code includes the service provider performing an automated scan of the implementation code that detects malicious code.

12. The system of claim 6, wherein the third code is validated by the service provider based at least in part on at least one of an author identification, a designated pipeline through which the third code is received, or an encryption technique applied to the third code.

13. The system of claim 6, wherein particular web resources associated with the third tier are isolated from other web resources associated with the first tier and the second tier.

14. The system of claim 6, wherein the web resources associated with the second tier are assigned to shared resources based at least in part on the service provider.

15. The system of claim 6, further comprising changing a classification of at least one of the web services based at least in part on a detected change in the code for the at least one of the web services.

16. The system of claim 6, further comprising reclassifying the web services to another tier based at least in part on one or more of a detected security feature included in the code for the web service, a detected vulnerability included in the code for the web service, an agreement by the entity to allow periodic scanning of the code for the web service, or a refusal by the entity to allow periodic scanning of the code for the web service.

17. A system, comprising:
a memory that stores computer-executable instructions;
a plurality of servers; and
a processor configured to access the memory and execute the computer-executable instructions to collectively at least:
host web services supported by a service provider;
analyze code included in the web services to detect one or more characteristics of the code;
classify at least one web service of the web services to at least one tier of a plurality of tiers based at least in part on the one or more characteristics of the code; and
provide the at least one web service to an entity based at least in part on the classification of the at least one web service,
wherein first web services classified in a first tier of the plurality of tiers are mutually supported by a first subset of the plurality of servers, and
wherein other web services classified in another tier of the plurality of tiers are supported individually by designated servers in a second subset of the plurality of servers and isolated from the first subset of the plurality of servers and other servers in the second subset of the plurality of servers.

18. The system of claim 17, wherein the computer-executable instructions are further executed to collectively at least classify the web services for the entity to a tier based at least in part on the web services including code provided by an authorized solution provider other than the service provider.

19. The system of claim 18, wherein the web services classified to a tier based at least in part on the web services including code provided by the authorized solution provider are mutually supported by another subset of the plurality of the servers that is exclusive of the first and second subset of the plurality of servers.

20. The system of claim 19, wherein the computer-executable instructions are further executed to collectively at least validate the code provided by the solution provider based at least in part on at least one of an author identification, a designated pipeline through which the code is received, or an encryption technique applied to the code.

21. A computer-readable storage device storing computer-executable instructions that, when executed by one or more computer systems, configure the one or more computer systems to perform operations comprising:
hosting web services supported by a service provider;
analyzing code included in the web services to detect one or more characteristics of the code;
classifying each of the web services to a plurality of tiers based at least in part on the one or more characteristics; and
providing at least a subset of the web services to an entity based at least in part on the classification of the web services, wherein the plurality of tiers includes:
a first tier encompassing first services comprising code provided by the service provider;
a second tier encompassing second services comprising code provided by the service provider and an authorized solution provider other than the service provider; and a third tier encompassing third services comprising code provided by a source other than the service provider and an authorized solution provider.

22. The computer-readable storage device of claim 21, further comprising instructions that, when executed by the one or more computer systems, further configure the one or more computer systems to perform operations comprising isolating the web services in the third tier from resources of all of the other web services.

23. The computer-readable storage device of claim 21, further comprising instructions that, when executed by the one or more computer systems, further configure the one or more computer systems to perform operations comprising assigning the web services in the second tier to shared resources based at least in part on the solution provider.

24. The computer-readable storage device of claim 21, further comprising instructions that, when executed by the one or more computer systems, further configure the one or more computer systems to perform operations comprising changing a classification of at least one of the web services based at least in part on a detected change in the code for the at least one of the web services.

\* \* \* \* \*